(12) United States Patent  (10) Patent No.: US 7,677,124 B2
Honma  (45) Date of Patent: Mar. 16, 2010

(54) TRANSMISSION OF VEHICLE

(75) Inventor: Shirou Honma, Akashi (JP)

(73) Assignee: Kawasaki Jukogyo Kabuhsiki Kaisha, Hyogo (JP)

( * ) Notice: Subject to any disclaimer, the term of this patent is extended or adjusted under 35 U.S.C. 154(b) by 909 days.

(21) Appl. No.: 11/488,763

(22) Filed: Jul. 19, 2006

(65) Prior Publication Data

US 2008/0314173 A1    Dec. 25, 2008

(51) Int. Cl.
F16H 59/00 (2006.01)
F16D 27/10 (2006.01)
G05G 9/00 (2006.01)
F16D 13/00 (2006.01)

(52) U.S. Cl. ............... 74/337.5; 74/125.5; 74/478.5; 192/46

(58) Field of Classification Search ............ 74/325, 74/329, 337.5, 473.16, 478, 125.5, 141.5, 74/142, 143, 478.5; 180/292, 230; 192/46
See application file for complete search history.

(56) References Cited

U.S. PATENT DOCUMENTS 4,093,264 A *  6/1978  Ishihara et al. ............ 280/296
5,411,448 A *  5/1995  Horii et al. ................ 477/102
6,698,303 B2 *  3/2004  Hoffmann et al. ......... 74/337.5
7,451,862 B2 *  11/2008  Kimes et al. ............... 192/46
7,484,605 B2 *  2/2009  Pawley et al. ............ 192/43.1

FOREIGN PATENT DOCUMENTS

JP    10-230894    9/1998

* cited by examiner

*Primary Examiner*—Roger Pang
(74) *Attorney, Agent, or Firm*—Wenderoth, Lind & Ponack L.L.P.

(57) ABSTRACT

The invention provides a transmission of a vehicle which can smoothly execute shift-up and shift-down operations. The transmission is provided with change gears, a shift member, a change drum, a change shaft rotationally operated at a predetermined angle by a rider, and a change operation force transmitting mechanism transmitting the rotation of the change shaft to the change drum. The change operation force transmitting mechanism includes a driven body integrally rotating with the change drum and having a concave portion in an inner peripheral surface, a pole holder arranged in an inner side of the driven body and rotationally reciprocating on the basis of a rotational reciprocation of the change shaft, a pole held to the pole holder, and being displaceable around a supporting point between an engaged state in which a leading end is engaged with the concave portion and a non-engaged state in which a leading end is away from the concave portion toward an inner side in a diametrical direction of the pole holder, an energizing means for energizing the pole to the engaged state, and a limiting means for limiting in such a manner that the supporting point of the pole is not displaced with respect to the pole holder.

4 Claims, 11 Drawing Sheets

TRANSMISSION OF VEHICLE

BACKGROUND OF THE INVENTION

1. Technical Field of the Invention

The present invention relates to a transmission of a vehicle, and more particularly to a transmission of a vehicle which is provided with change gears, and changes an engagement state of the change gears by utilizing a change drum having a cam groove in an outer peripheral surface, and executes a shift up and a shift down.

2. Prior Art

As a prior art of this kind of transmission, there is a transmission of a motor cycle disclosed in Japanese Unexamined Patent Publication No. 10-230894. The transmission is provided with a gear support shaft such as an input shaft, an output shaft or the like, a plurality of change gears, a shift fork changing an engagement state of the change gears, a change drum moving the shift fork in an axial direction of the gear support shaft, a change shaft rotationally operated at a predetermined angle via a change lever by a rider, and a change operation force transmitting mechanism transmitting the rotation of the change shaft at the predetermined angle to the change drum.

FIG. 15 is a schematically perspective view of a change lever (a change pedal) 301, a change shaft 302, a change drum 303, a plurality of shift forks 305 and a change operation force transmitting mechanism 310 in accordance with the prior art. FIG. 16 is an enlarged view of a cross section cutting the change operation force transmitting mechanism 310 in FIG. 15 along a surface perpendicular to an axial core O1 of the change drum 303, and FIG. 17 is an enlarged view of a cross section along a line XVII-XVII in FIG. 16. FIG. 18 is a side elevational view of a pole 316.

In FIG. 15, the change lever 301 is provided in one end of the change shaft 302 so as to be integrally rotatable, and a first sector gear 315 is provided in the other end of the change shaft 302. When the rider pushes up or pushes down the change lever 301, the change shaft 302 and the first sector gear 315 rotate in a direction of U1 or a direction of Dl at a predetermined angle. A plurality of cam grooves 311 are formed in an outer peripheral surface of the change drum 303, and each of engagement pins 305a of the shift forks 305 is engaged with each of the cam grooves 311. The shift fork 305 is selectively moved in an axial direction on the basis of a cam operation of the cam groove 311 by rotating the change drum 303 in a direction of U2 or a direction of D2 at a predetermined angle, thereby an engagement state of change gears (not shown) is changed.

The change operation force transmitting mechanism 310 comprises a driven ring 312 fixed to an end surface of the change drum 303 so-as to integrally rotate with the change drum 303, a pole holder 313 accommodated within the driven ring 312 so as to be relatively rotatable with respect to the driven ring 312, a pair of poles 316 held to the pole holder 313, a second sector gear 314 fixed to the pole holder 313 so as to be integrally rotatable and engaging with the first sector gear 315, and the first sector gear 315.

In FIG. 16, six concave portions 320 are formed in an inner peripheral surface of the driven ring 312 at a uniform interval in a peripheral direction, and a pair of semicircular concave portions 321 is formed in the pole holder 313. A pair of poles 316 are structured such that one of them corresponds to a pole for shifting up, the other of them corresponds to a pole for shifting down, and a base end of each of the poles 316 is formed in a semicircular shape, and is held to the concave portion 321 so as to be rotatable around a pole support point O3. The pole 316 rotates around the pole support point O3 between a disengaged state (a state in FIG. 16) in which the pole 316 is not engaged with the concave portion 320, and an engaged state in which a leading end of the pole 316 protrudes to an outer side in a diametrical direction so as to be engaged with any one of the concave portions 320. Each of the poles 316 is pushed to the engaged state by a push rod 331 and a spring 332 accommodated in a spring accommodating hole 330 of the pole holder 313. In this case, as shown in FIGS. 17 and 18, a leading end of the push rod 331 is fitted to a groove 316a formed in a leading end portion of the pole 316.

In the conventional structure mentioned above, for example, in the case of shifting up from any position of first speed to fifth speed, the change shaft 302 and the first sector gear 315 are rotated in the direction U1 by pushing up the change lever 301, whereby the second sector gear 314 and the pole holder 313 are rotated in the direction of U2 at a predetermined angle.

In FIG. 16, the lower pole 316 is engaged with the concave portion 320 of the driven ring 312 on the basis of the rotation of the pole holder 313 in the direction of U2 at a predetermined angle, thereby rotating the change drum 303 in FIG. 15 in the direction of the arrow U2 at the predetermined angle, and shifting up the engaged state of the change gears via the shift fork 305.

As shown in FIG. 16, in the support structure of the pole 316, in which the semicircular base end of the pole 316 is only fitted to the semicircular concave portion 321 of the pole holder 313, the following problem is generated. In other words, when the pole holder 313 is returned to the original position in the direction of D2 with respect to the driven ring 312 in a resting state, after the shift-up operation, the pole 316 is returned in a state in which the leading end is brought into pressure contact with an inner peripheral surface of the driven ring 312. Accordingly, there is applied a force intending to pull the pole 316 out of the concave portion 321 of the pole holder 313 on the basis of a frictional resistance between the inner peripheral surface of the driven ring 312 and the leading end of the pole 316, whereby the pole 316 does not smoothly move in the direction D2, and rattles or slants. In other words, it is hard to smoothly execute a returning process after finishing the shift-up operation. The same matter is applied to the returning process after the shift-down operation. Further, with respect to the remaining pole 316 which is not engaged with the concave portion 321 at a time of the shift-up operation or the shift-down operation, in a pair of poles 316, the "force intending to pull out" is applied just after the shift-up or shift-down operation is started.

SUMMARY OF THE INVENTION

The present invention is made by taking the problem mentioned above into consideration, and an object of the present invention is to provide a transmission of a vehicle in which a pole smoothly moves to the original position together with a pole holder without rattling at a time of a shifting operation, particularly at a time when the pole is returned to the original position after shifting.

In order to achieve the object mentioned above, in accordance with the present invention, there is provided a transmission of a vehicle comprising: a plurality of change gears supported to a plurality of gear. support shafts; a shift member changing an engaged state of the change gears by moving in an axial direction of the gear support shafts; a change drum having a cam groove engaging with the shift member in an outer peripheral surface thereof and moving the shift member in an axial direction of the gear support shafts by rotating at a predetermined angle; a change shaft rotationally operated at a predetermined angle by a rider; and a change operation force transmitting mechanism transmitting the rotation of the change shaft to the change drum, wherein the change operation force transmitting mechanism includes: a driven body integrally rotating with the change drum and having a concave portion in an inner peripheral surface thereof; a pole holder arranged in an inner side of the driven body and rotationally reciprocating on the basis of a rotational reciprocation of the change shaft; a pole held to the pole holder, and being displaceable around a supporting point between an engaged state in which a leading end of the pole is engaged with the concave portion and a disengaged state in which the leading end is away from the concave portion toward an inner side in a radial direction of the pole holder; an energizing means for pushing the pole to the engaged state; and a limiting means for limiting a displacement of the supporting point of the pole with respect to the pole holder.

As mentioned above, in the transmission of the vehicle, the force intending to pull the pole out of the concave portion of the pole holder is applied on the basis of the friction between the leading end of the pole and the inner peripheral surface of the driven ring, in the stroke in which the poles are returned to the original position together with the pole holder, after the shift-up or shift-down operation. However, in accordance with the structure mentioned above, since the displacement of the supporting point of the pole is prevented by the limiting means, the pole can be returned to the original position without rattling. In other words, it is possible to smoothly execute the returning operation after the shift operation without rattling. Further, it is possible to prevent the slant of the pole (the slant of the supporting point of the pole).

In the transmission of the vehicle mentioned above, it is preferable that the limiting means may comprise engagement portions which are formed respectively in the pole and the pole holder and are engaged with each other.

In accordance with the structure mentioned above, the limiting means of the pole supporting point can be provided without adding any particularly new part.

The limiting means may comprise a support hole provided in one of the pole and the pole holder, and a pole support shaft provided in the other and fitted to the support hole.

In accordance with the structure mentioned above, it is possible to more securely prevent the displacement of the supporting point of the pole.

DETAILED DESCRIPTION OF THE INVENTION

Figure 1:
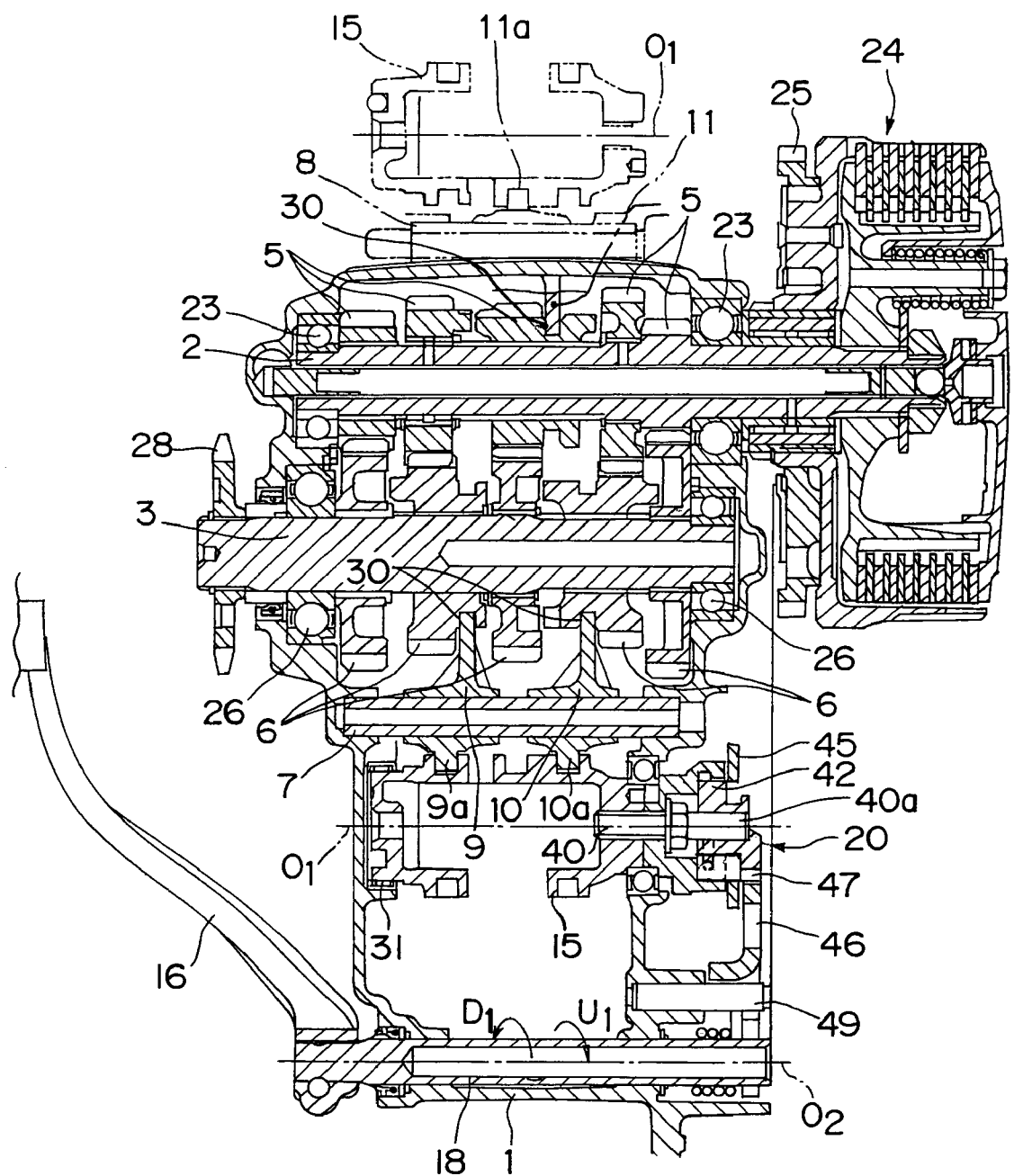
FIG. 1 is a vertical cross sectional view showing an embodiment of a transmission of a motor cycle in accordance with the present invention, and cut by a cross section passing through respective axial cores of an input shaft, an output shaft, a shift fork support shaft and a change drum of the transmission so as to be expanded.

FIGS. 1 to 9 show an embodiment of a transmission of a motor cycle in accordance with the present invention, and more particularly show a transmission having five forward speed stages and structured such that a neutral position exists between a first speed stage and a second speed stage. FIG. 1 is a cross sectional expansion plan view of the transmission. In the drawing, a shift fork support shaft 8 mentioned below is shown by a two-dot chain line. In this FIG. 1, the transmission is provided with an input shaft (a gear support shaft) 2, an output shaft (a gear support shaft) 3, a plurality of change gears 5 and 6 installed to the input shaft 2 and the output shaft 3, a pair of shift fork support shafts 7 and 8, a plurality of shift forks 9, 10 and 11 fitted to the shift fork support shafts 7 and 8 so as to be movable in an axial direction, a change drum 15 for moving the shift forks 9, 10 and 11 in an axial direction of the shift fork support shafts 7 and 8, a change shaft 18 rotationally operated only at a predetermined angle via a change lever (a change pedal) 16 by a rider, and a change operation force transmitting mechanism 20 transmitting a rotation of the change shaft 18 to the change drum 15, within a transmission case 1 integrally formed with a crank case (not shown) of an engine.

The input shaft 2 is supported to the transmission case 1 by a pair of bearings 23, is provided with a multi-disc friction type clutch 24 in one end of the input shaft 2, and is coupled to a crank shaft (not shown) of the engine via the multi-disc friction type clutch 24 and an input gear 25 so as to transmit a power of the engine and freely connect and disconnect the power. The output shaft 3 is supported to the transmission case 1 by a pair of bearings 26, is provided with an output sprocket 28 in one end of the output shaft 3, and the output sprocket 28 is coupled to a rear wheel of a vehicle via a drive chain (not shown) so as to freely transmit the power to the rear wheel.

Some (for example, change gears arranged in an intermediate portion in an axial direction) of a plurality of change gears 5 and 6 are spline fitted respectively to the input shaft 2 and the output shaft 3 so as to be movable in the axial direction, and are provided with annular engagement grooves 30, and forked portions of the shift forks 9, 10 and 11 are respectively engaged with the annular engagement grooves 30. In other words, the structure is constituted such as to selectively move the change gears 5 and 6 having the annular grooves 30 in the axial direction by selectively moving the shift forks 9, 10 and 11 in the axial direction, whereby it is possible to change the engaged state between the change gears 5 and 6 to any one of the first speed to the fifth speed and the neutral position.

Figure 2:
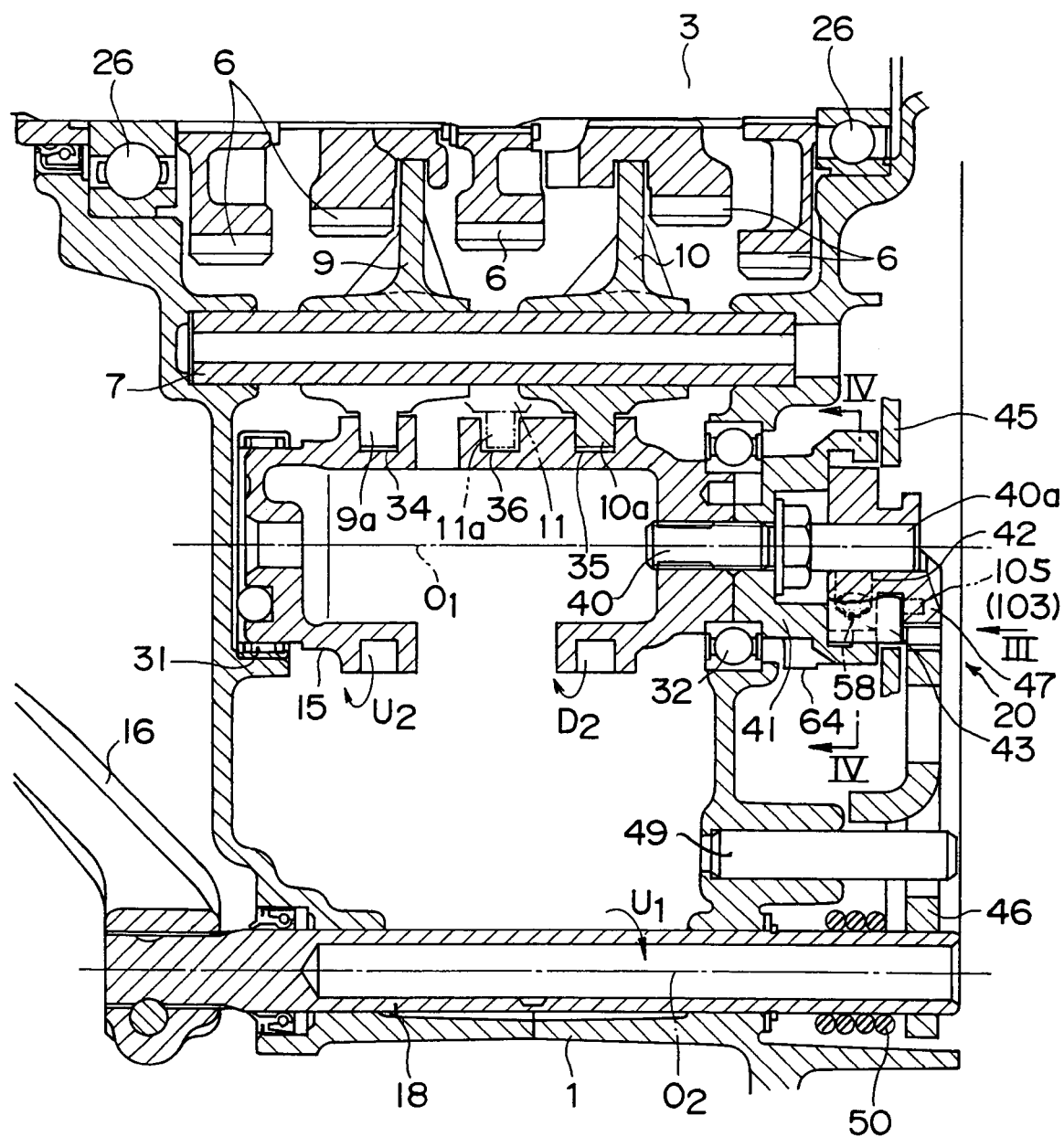
FIG. 2 is an enlarged cross sectional view of a change drum and a shift fork portion in FIG. 1.

FIG. 2 is an enlarged cross sectional view of the change drum 15 in FIG. 1 and a portion near the change drum 15. The change drum 15 is rotatably supported to the transmission case 1 via a pair of bearings 31 and 32, and cam grooves 34, 35 and 36 respectively engaging with engagement pins 9a, 10a and 11a of the respective shift forks 9, 10 and 11 are formed in an outer peripheral surface of the change drum 15. The shift forks 9, 10 and 11 are moved selectively in the axial direction by a cam operation of the cam grooves 34, 35 and 36 generated by a rotation of the change drum 15 at a predetermined angle (for example, 60 degree).

The change operation force transmitting mechanism 20 comprises a driven ring (a driven body) 41 fixed to an end surface of the change drum 15 in the axial direction by a bolt 40, a pole holder 42 accommodated in an inner portion of the driven ring 41 and rotatably fitted to a shaft 40a formed in the bolt 40, a pair of poles 43 (only one pole is illustrated in FIG. 2) held to the pole holder 42, a guide ring 45 fixed to the transmission case 1, a second sector gear 47 integrally formed with the pole holder 42, and a first sector gear 46 fixed to one end of the change shaft 18 and engaging with the second sector gear 47. The guide ring 45 is arranged adjacent to the driven ring 41 in the axial direction, covers an outer periphery of the pole 43 in a radial direction, and restricts a displacement of the pole 43 in a radial direction.

Figure 3:
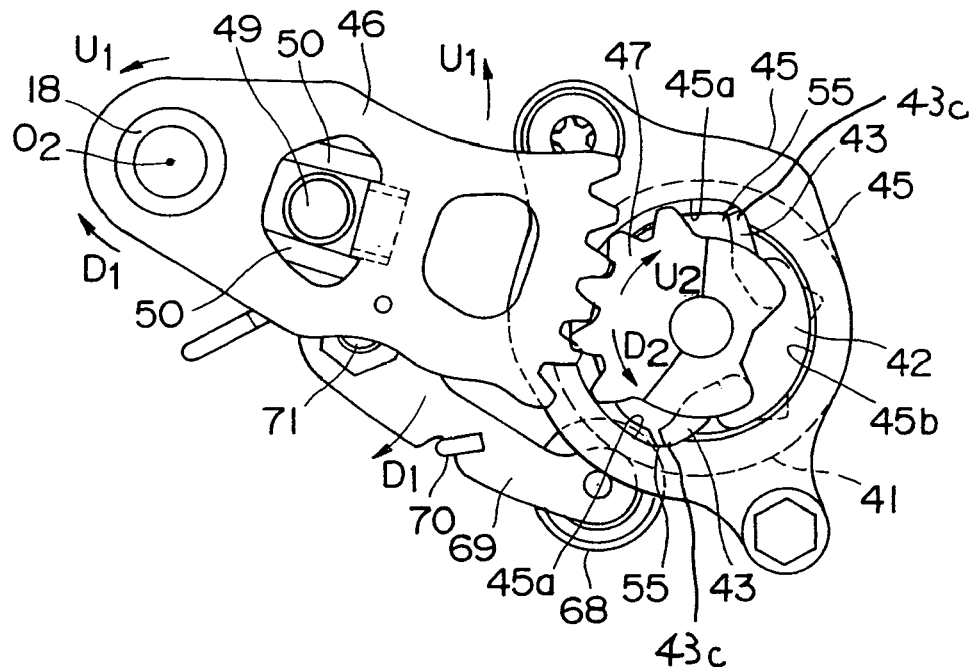
FIG. 3 is a side elevational view of FIG. 1 of a change operation force transmitting mechanism (a view as seen from an arrow III in FIG. 2)

The change shaft 18 and the first sector gear 46 are held at an original position (a position shown in FIGS. 3 and 7) by a return spring 50 wound around the change shaft 18 at a time of a no-change operation, and the rider pushes up or down the change lever 17, whereby the change shaft 18 and the first sector gear 46 are rotated at a predetermined angle in a direction U1 or a direction D1 from the original position shown in FIG. 3. Both end portions of the return spring 50 are engaged with both sides of a locking pin 49 fixed to the transmission case 1 (refer to FIGS. 1 and 2), whereby even in the case that the change shaft 18 and the first sector gear 46 are rotated in whichever direction of the direction U1 and the direction D1, the change shaft 18 and the first sector gear 46 are automatically returned to the original position on the basis of a returning force of the return spring 50 after the rider cancels the operation force applied to the change lever 16.

Figure 4:
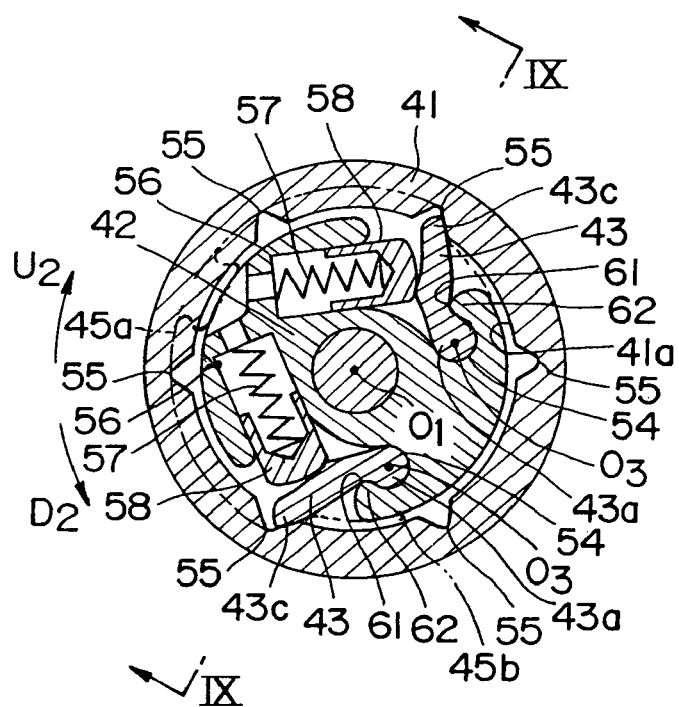
FIG. 4 is an enlarged view of a cross section along a line IV-IV in FIG. 2.

FIG. 4 is an enlarged view of a cross section along a line IV-IV in FIG. 2. Six engagement concave portions 55 corresponding to the respective speed ranges are formed in an inner peripheral surface 41a of the driven ring 41 at a uniform interval in a peripheral direction. A pair of semicircular pole holding concave portions 54 is formed in the pole holder 42, and a pair of spring accommodating holes 56 is formed therein.

Figure 8:
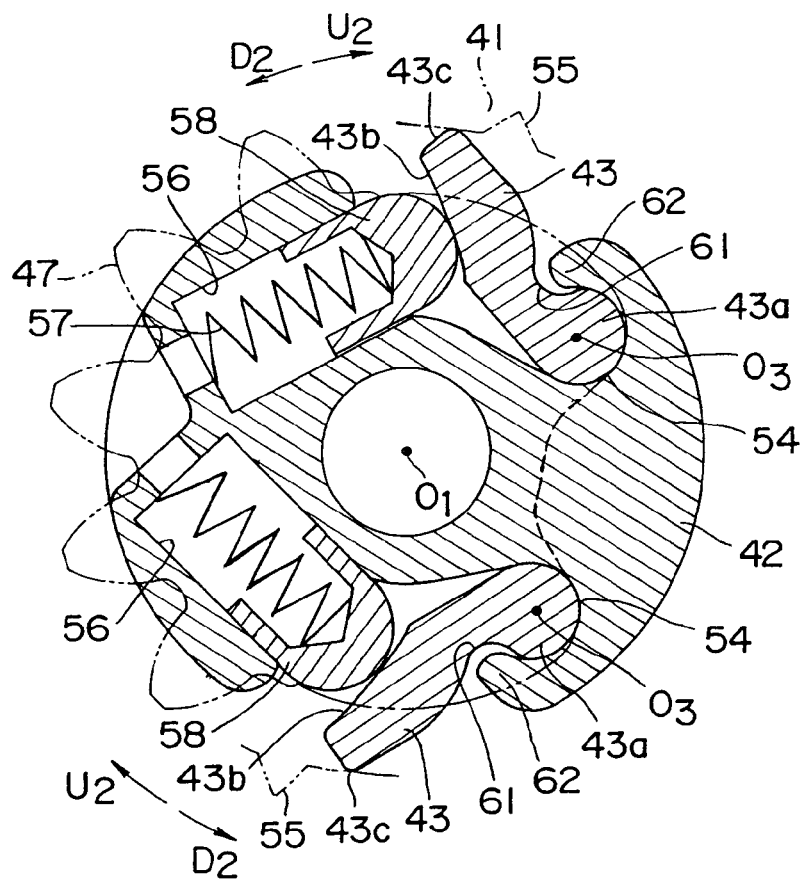
FIG. 8 is an enlarged view of a cross section along the line IV-IV in FIG. 2 clearly showing a positional relation between the pole holder and the pole.

FIG. 8 is an enlarged cross sectional view of the pole holder 42 and the pole 43 in FIG. 4. A cross sectional shape of a base end 43a of each of the poles 43 is formed in a partially circular shape, and the base end 43a is held to the concave portion 54 so as to be rotatable around the pole supporting point O3. The upper pole 43 in FIG. 8 is utilized in the case of shifting down in a range from the fifth speed stage to the first speed stage and in the case of shifting from the neutral stage to the first speed stage, and extends to an outer side in the radial direction and a direction D2 from the corresponding concave portion 54. On the other hand, the lower pole 43 in FIG. 8 is utilized in the case of shifting up in a range from the first speed stage to the fifth speed stage and in the case of shifting back from the first speed stage to the neutral state, and extends to the outer side in the radial direction and a direction U2 from the corresponding concave portion 54.

Each of the spring accommodating holes 56 is open toward a back surface 43b of the corresponding pole 43, a coil spring 57 and a push rod 58 are sequentially accommodated as an energizing means in each of the spring accommodating holes 56, and the coil spring 57 pushes the push rod 58 to the corresponding pole 43 side, and brings a leading end of the push rod 58 into pressure contact with the back surface 43b of the pole 43.

Accordingly, as shown in FIG. 4, the leading end 43c of the pole 43 is moved to an outer side in the radial direction so as to be engaged with any of the engagement concave portion 55, whereby the pole 43 becomes in an engaged state, and the leading end 43c is moved to an inner side in the radial direction against the coil spring 57 so as to be disconnected from the engagement concave portion 55, whereby the pole 43 becomes in a disengaged state.

Figure 5:
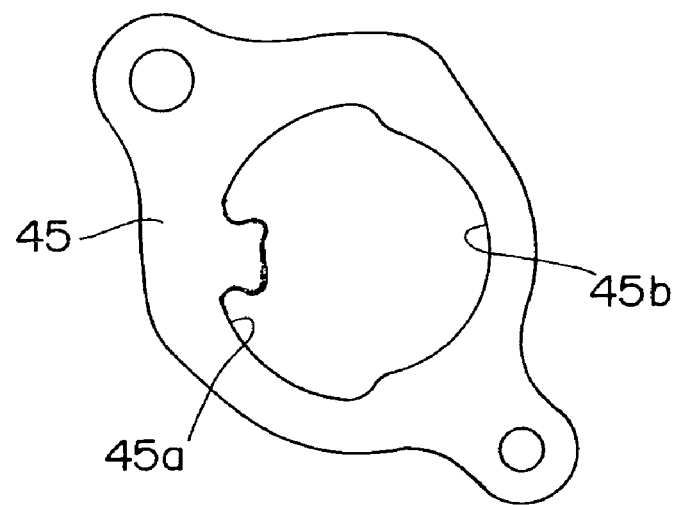
FIG. 5 is a side elevational view (a view as seen from an arrow III in FIG. 2) of a guide ring.

FIG. 5 is a side elevational view (a view as seen from an arrow III in FIG. 2) of the guide ring 45 shown in FIG. 2. An inner peripheral surface of the guide ring 45 comprises a first guide surface 45a having a larger diameter, and a second guide surface 45b having a smaller diameter than the first guide surface 45a. As shown in FIG. 3, the first guide surface 45a is set to a diameter allowing the pole 43 to be changed to the engaged state. On the other hand, the second guide surface 45b is set to a diameter compressing the leading end of the pole 43 to the inner side in the radial direction so as to limit to the disengaged state in which the leading end of the pole 43 is not engaged with the concave portion 55. Further, a forming range in the circumferential of the first guide surface 45a is set such that the upper and lower poles 43 are positioned in both end portions of the first guide surface 45a in the peripheral direction respectively under the engaged state when the second sector gear 47 and the pole holder 42 are positioned at the original position. Accordingly, in the case that the pole holder 42 in FIG. 3 is rotated in the direction U2 from the original position, the lower pole 43 is moved in the direction U2 while maintaining the engaged state with the engagement concave portion 55, thereby driving the driven ring 41 in the direction U2. On the other hand, the upper pole 43 is pressed in the disengaged state by the second guide surface 45b of the guide ring 45, and is disconnected from the concave portion 55.

In FIG. 8, a cross sectional shape of the leading end 43c of each of the poles 43 is formed approximately in a flat-head shape in such a manner as to be engaged with the engagement concave portion 55, and the back surface 43b with which the push rod 58 is brought into contact is formed in a gentle concaved circular arc shape in a side view. The cross sectional shapes of the respective poles 43 are made identical over an entire width of the pole holder 42 in the axial direction. In other words, the pole 43 has the cross sectional shape shown in FIG. 8 over an entire width of the pole holder 42 in the axial direction. Accordingly, the groove (316a) for engaging the push rod as in the prior art in FIG. 17 or the like is not formed in the back surface 43b of the pole 43.

In FIG. 8, a circular arc shaped concave engagement portion 61 is formed in a surface of each of the poles 43 as a limiting means of the pole supporting point O3, and a circular arc shaped convex engagement portion 62 engaging with the concave engagement portion 61 from an outer side in the radial direction is formed in the pole holder 42.

Figure 6:
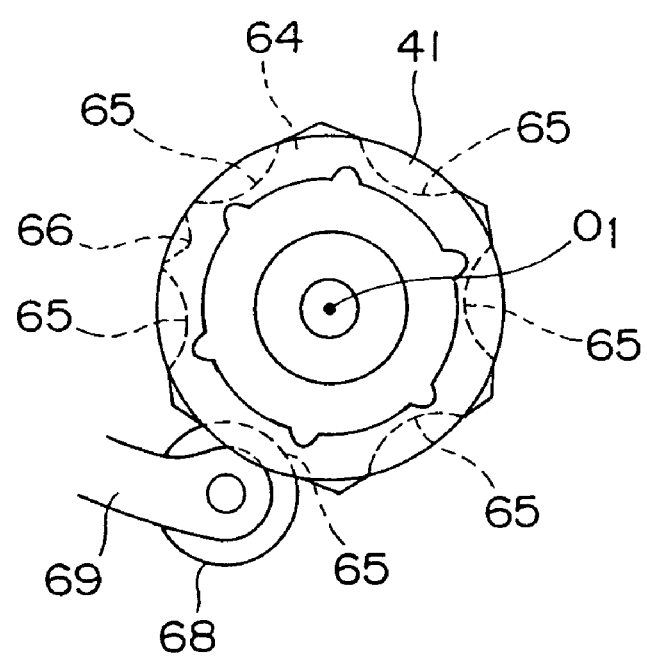
FIG. 6 is a side elevational view (a view as seen from the arrow III in FIG. 2) of a driven ring (a driven body)
Figure 7:
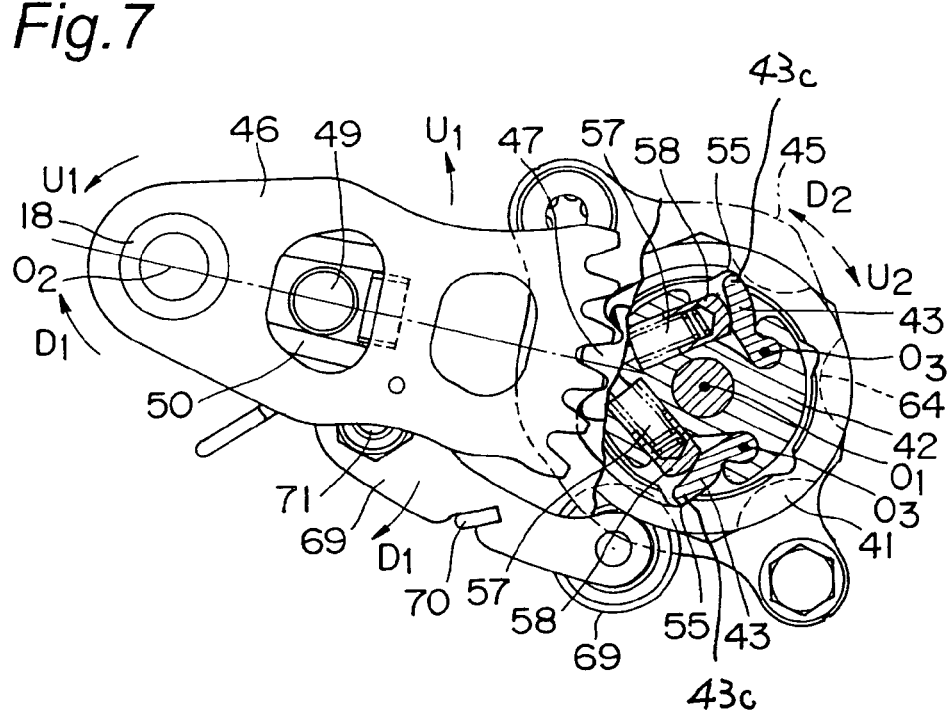
FIG. 7 is a side elevational view (a view as seen from an arrow III) of the change operation force transmitting mechanism, and particularly showing a pole holder by a cross section along a line IV-IV in FIG. 2.

FIG. 6 is a side elevational view (a view as seen from an arrow III in FIG. 2) of the driven ring 41. A positioning body 64 is integrally formed in the driven ring 41, six semicircular positioning concave portions 65 are formed in an outer peripheral surface of the positioning body 64 at a uniform interval in a peripheral direction so as to correspond to a first speed stage to a five speed stage, and a V-shaped concave portion 66 for neutral being shallower than the concave portion 65 is formed between the positioning concave portions 65 of the first speed stage and the second speed stage. A positioning roller 68 is brought into contact with an outer peripheral surface of the positioning body 64, and the positioning roller 68 is supported to a leading end of an arm 69. As shown in FIG. 7, the arm 69 is rotatably supported to a support shaft 71 fixed to the transmission case 1, pushed to the positioning body 64 side by a spring 70, and presses the positioning roller 68 to an outer peripheral surface of the positioning body 64.

A description will be given of an operation.

(1) State at a Time of Non-change Operation

FIGS. 3 and 7 show a state of traveling, for example, at a third speed stage. Both of the poles 43 are respectively pressed to the outer side in the radial direction by the coil springs 57 and the push rods 58, whereby the leading ends 43c of the poles 43 are engaged with the corresponding engagement concave portions 55 respectively (engaged state). Further, the change shaft 18, the first sector gear 46, the second sector gear 47 and the pole holder 42 are maintained at the original position by the return spring 50.

(2) Shift-up Operation

The rider pushes up the change lever 16 shown in FIG. 1, thereby rotating the change shaft 18 and the first sector gear 46 in the direction U1 at a predetermined angle. Accordingly, in FIG. 3, the second sector gear 47 and the pole holder 42 are rotated in the direction U2 approximately at 60 degree on the basis of the engagement between the first sector gear 46 and the second sector gear 47, and each of the poles 43 is moved in the direction U2 together with the pole holder 42. Since the lower pole 43 moves within the first guide surface 45a of the guide ring 45 in this moving stroke, the engaged state with the concave portion 55 is maintained, thereby rotating the driven ring 41 in the direction U2 approximately at 60 degree. On the other hand, since the upper pole 43 moves within the second guide surface 45b of the guide ring 45, it is pressed to the inner side in the radial direction by the second guide surface 45b, and is kept in the disengaged state in which it is disconnected from the engagement concave portion 55.

In FIG. 2, the change drum 15 is rotated in the direction U2 only at the predetermined angle (60 degree) together with the driven ring 41, thereby selectively moving the shift forks 9, 10 and 11 in the axial direction via the cam grooves 34, 35 and 36 of the change drum 15, and shifting up the engaged state of the change gears 5 and 6 from the third speed stage to the fourth speed stage.

(3) Return Operation from Shift-up Operation

When the rider cancels the operation force applied to the change lever 16 after the shift-up operation is finished, the change shaft 18 and the first sector gear 46 in FIG. 3 are rotated in the direction D1 on the basis of the elastic force of the return spring 50 so as to be returned to the original position. Accordingly, the second sector gear 47 and the pole holder 42 are rotated in the direction D2 with respect to the driven ring 41 so as to be returned to the original position.

In FIG. 4, in the returning stroke mentioned above, the lower pole 43 is returned in the direction D2 in a state in which the leading end 43c is brought into contact with the inner peripheral surface 41a of the driven ring 41 so as to be engaged with the next engagement concave portion 55. On the other hand, the upper pole 43 becomes in the state in which the leading end 43c of the upper pole 43 is disconnected from the engagement concave portion 55 by the second guide surface 45b of the guide ring 45 when the shift-up operation is finished, is smoothly changed to the state of being brought into contact with the inner peripheral surface 41a of the driven ring 41 from the state of being brought into contact with the second guide surface 45b of the guide ring 45, is returned in the direction D2 in the state of being brought into contact with the inner peripheral surface 41a of the driven ring 41, and is engaged with the next engagement concave portion 55 when reaching the first guide surface 45a.

Since the leading end 43c of the pole 43 is moved while sliding with the inner peripheral surface 41a of the driven ring 41 in the returning stroke mentioned above, there is applied a force intending to pull the pole 43 out of the concave portion 54 of the pole holder 42, on the basis of the sliding resistance between the inner peripheral surface 41a of the driven ring 41 and the leading end 43c of the pole 43. In this case, since the pole 43 is controlled by the engagement between the concave engagement portion 61 and the convex engagement portion 62 which are the limiting means of the pole supporting point O3, the pole supporting point O3 is not displaced. Therefore, the pole 43 is smoothly moved in the direction D2 without rattling, and is engaged with the next engagement concave portion 55. In other words, it is possible to smoothly execute the returning operation after the shift-up operation without rattling.

(4) Shift-down Operation

In comparison with the shift-up operation mentioned above, the shift-down operation is different only in the rotating direction of the change shaft 18 and the change drum 15, and is basically the same as the shift-up operation. The rider pushes down the change lever 16 shown in FIG. 1, thereby rotating the change shaft 18 and the first sector gear 46 in the direction D1 at a predetermined angle. Accordingly, in FIG. 7, the second sector gear 47 and the pole holder 42 are rotated in the direction D2 approximately at 60 degree on the basis of the engagement between the first sector gear 46 and the second sector gear 47, and each of the poles 43 is moved in the direction D2 together with the pole holder 42. Since the upper pole 43 moves within the first guide surface 45a of the guide ring 45 in this moving stroke, the engaged state with the engagement concave portion 55 is maintained, thereby rotating the driven ring 41 in the direction D2 approximately at 60 degree. On the other hand, since the lower pole 43 moves within the second guide surface 45b of the guide ring 45, it is pressed to the inner side in the radial direction by the second guide surface 45b, and becomes in the disengaged state in which it is disconnected from the engagement concave portion 55.

In FIG. 2, the change drum 15 is rotated in the direction D2 only at the predetermined angle (60 degree) together with the driven ring 41, thereby selectively moving the shift forks 9, 10 and 11 in the axial direction via the cam grooves 34, 35 and 36 of the change drum 15, and shifting down the engaged state of the chain gears 5 and 6 from the third speed stage to the second speed stage.

(5) Return Operation from Shift-down Operation

When the rider cancels the operation force applied to the change lever 16 after the shift-down operation is finished, the change shaft 18 and the first sector gear 46 in FIG. 3 are rotated in the direction U1 on the basis of the elastic force of the return spring 50 so as to be returned to the original position. Accordingly, the second sector gear 47 and the pole holder 42 are rotated in the direction U2 with respect to the driven ring 41 so as to be returned to the original position.

In this returning stroke, the upper pole 43 is returned in the direction U2 in a state in which the leading end 43c is brought into contact with the inner peripheral surface 41a of the driven ring 41 so as to be engaged with the next engagement concave portion 55. On the other hand, the lower pole 43 becomes in the state in which the leading end 43c of the lower pole 43 is disconnected from the engagement concave portion 55 by the second guide surface 45b of the guide ring 45 at a time when the shift-down operation is finished, is smoothly changed to the state of being brought into contact with the inner peripheral surface 41a of the driven ring 41 from the state of being brought into contact with the second guide surface 45b of the guide ring 45 in the returning stroke mentioned above, is returned in the direction U2 in the state of being brought into contact with the inner peripheral surface 41a of the driven ring 41, and is engaged with the next engagement concave portion 55 at a time of reaching the first guide surface 45a.

Since the leading end 43c of each of the poles 43 is also moved while sliding with the inner peripheral surface 41a of the driven ring 41 in the same manner as the returning stroke from the shift-up operation, in the returning stroke after the shift-down operation mentioned above, there is applied a force intending to pull the pole 43 out of the concave portion 54 of the pole holder 42, on the basis of the sliding resistance between the inner peripheral surface 41a of the driven ring 41 and the leading end 43c of the pole 43. In this case, since the pole 43 is controlled by the engagement between the concave engagement portion 61 and the convex engagement portion 62 which are the limiting means of the pole supporting point O3, the pole 43 is smoothly moved in the direction U2 without rattling, and is engaged with the next engagement concave portion 55. In other words, it is possible to smoothly execute the returning operation after the shift-down operation without rattling.

Figure 9:
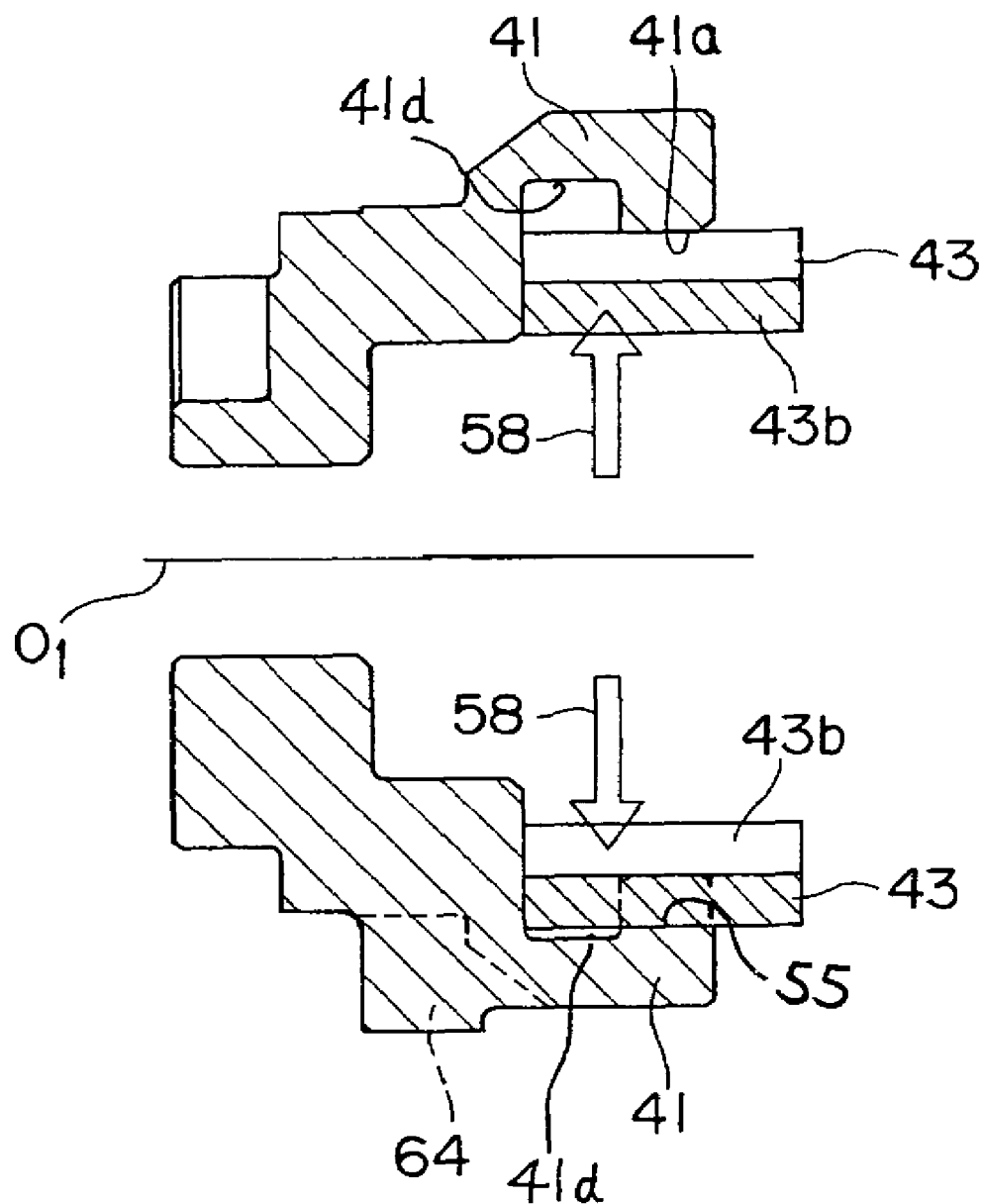
FIG. 9 is an enlarged view of a cross section along a line IX-IX of a driven ring and the pole in FIG. 4, in which the upper pole is shown in a state in which it is disconnected from a concave portion.

Further, in this embodiment, as shown in FIG. 2, since the width of the pole 43 in the axial direction exists over the inner portion of the guide ring 45 from the inner portion of the driven ring 41, and the push rod 48 is arranged within the pole holder 42 at the position deviated from a center of the width of the pole 43 in the axial direction close to the change drum side (a left side in FIG. 2), the push rod 58 is shifted to a left side from the inner peripheral surface 41a of the leading end portion (a right end portion in FIG. 9) of the driven ring 41 in the axial direction, as shown in FIG. 9, and pushes the pole 43 at a corresponding position to an annular groove 41d. Accordingly, the pressing force of the push rod 58 serves as a force intending to slant the supporting point (axis) O3 of the pole 43. On the contrary, in accordance with the present embodiment, since the concave engagement portion 61 and the convex engagement portion 62 limiting the displacement of the pole supporting point O3 are provided, as shown in FIG. 8, the pole supporting point O3 is not slanted even if the inner peripheral surface 41a of the driven ring 41 and the leading end 43c of the pole 43 are brought into slidable contact with each other, as mentioned above, at a time of the shift-up operation or the shift-down operation, so that it is possible to smoothly return from the shift-up state or the shift-down state.

Other Operations and Effects (1) In FIG. 8, since the cross sectional shape of the pole 43 is formed in the same shape over an entire width of the pole 43 in the axial direction, it is possible to easily assemble the pole 43 within the pole holder 42 in the axial direction without keeping the state in which the worker forcibly presses the coil spring 57 and the push rod 58 previously accommodated within the spring accommodating hole 56 into the spring accommodating hole 57, at a time of assembling the pole 43 in the holding concave portion 54 of the pole holder 42. Further, it is possible to easily execute the work of detaching the pole 43 from the concave portion 54. Further, in comparison with the structure in which the groove for bringing the push rod into contact is formed in the back surface of the pole, as in the prior art in FIG. 17, it is possible to reduce a number of parts working steps, it is easy to manufacture the pole, and it is possible to reduce a parts cost. Further, it is possible to set the upper and lower poles 43 in FIG. 3 to a common part, and there is no risk that the pole 43 is erroneously assembled.

(2) Since the cross sectional shape of the pole 43 is formed in the same shape over the entire width in the axial direction, the back surface 43b of the pole 43 is formed as one surface having no concavity and convexity such as a groove or the like. Therefore, even if a mounting error exists between the push rod 58 and the pole 43, it is possible to bring the push rod 58 into contact with the back surface 43b of the pole 43 without scraping, in comparison with the structure in which the groove is formed in the back surface of the pole so as to bring the push rod into contact therewith such as the prior art in FIG. 17.

Figure 10:
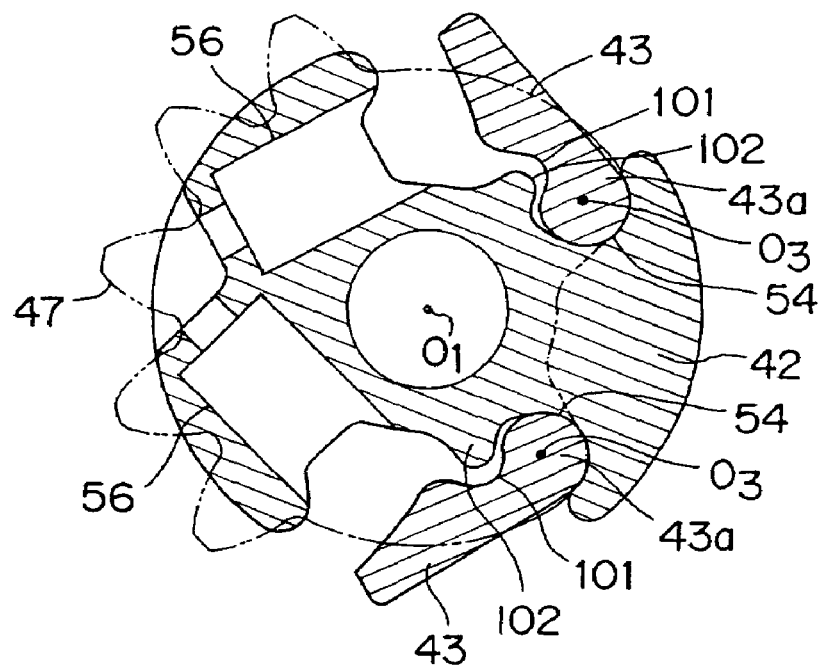
FIG. 10 shows a modified example of a limiting means of a pole supporting point, and is a similar enlarged view of a cross section to FIG. 8.

Other Embodiments (1) FIG. 10 shows a modified example of the limiting means of the pole supporting point O3. A concave engagement portion 101 is formed in the pole 43, and a convex engagement portion 102 is formed in the pole holder 42. In this embodiment, the same reference numerals are attached to the same parts as those of the embodiment in FIGS. 1 to 9.

Figure 11:
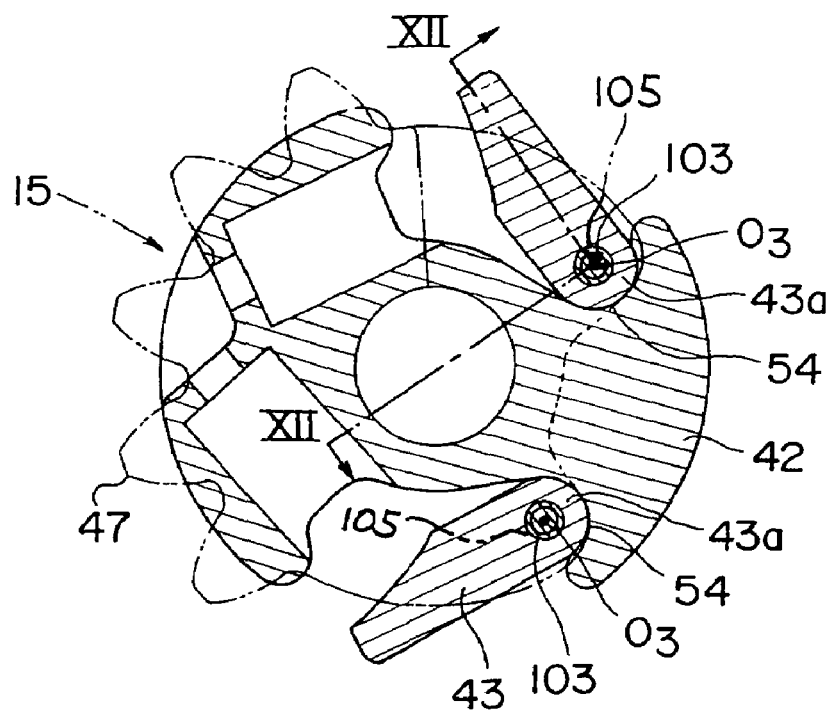
FIG. 11 shows the other modified example of the limiting means of the pole supporting point, and is a similar enlarged view of a cross section to FIG. 8.
Figure 12:
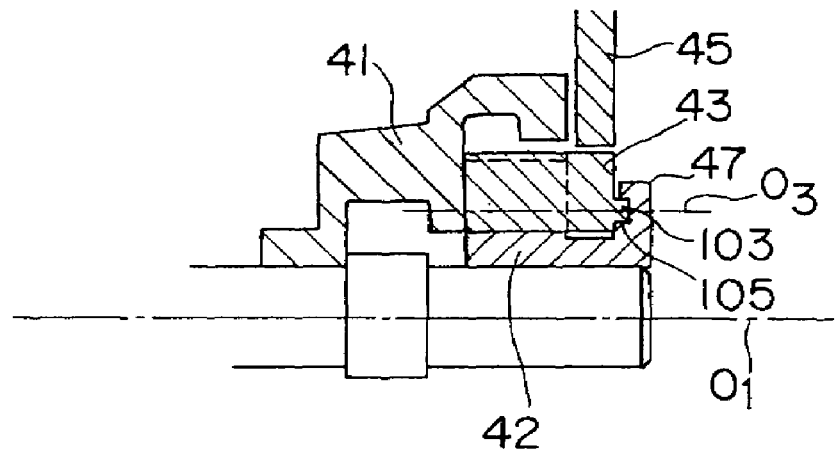
FIG. 12 is a cross sectional view along a line XII-XII in FIG. 11.

(2) FIG. 11 shows the other modified example of the limiting means of the pole supporting point O3. A pole supporting shaft 103 in parallel to the axial core O1 of the change drum 15 is provided in a protruding manner in an end surface of the pole supporting point O3 in the axial direction. FIG. 12 is a cross sectional view along a line XII-XII in FIG. 11. The pole supporting shaft 103 is supported to a support hole 105 formed in an end surface of the second sector gear 47. In this embodiment, the same reference numerals are attached to the same parts as those of the embodiment in FIGS. 1 to 9.

Figure 13:
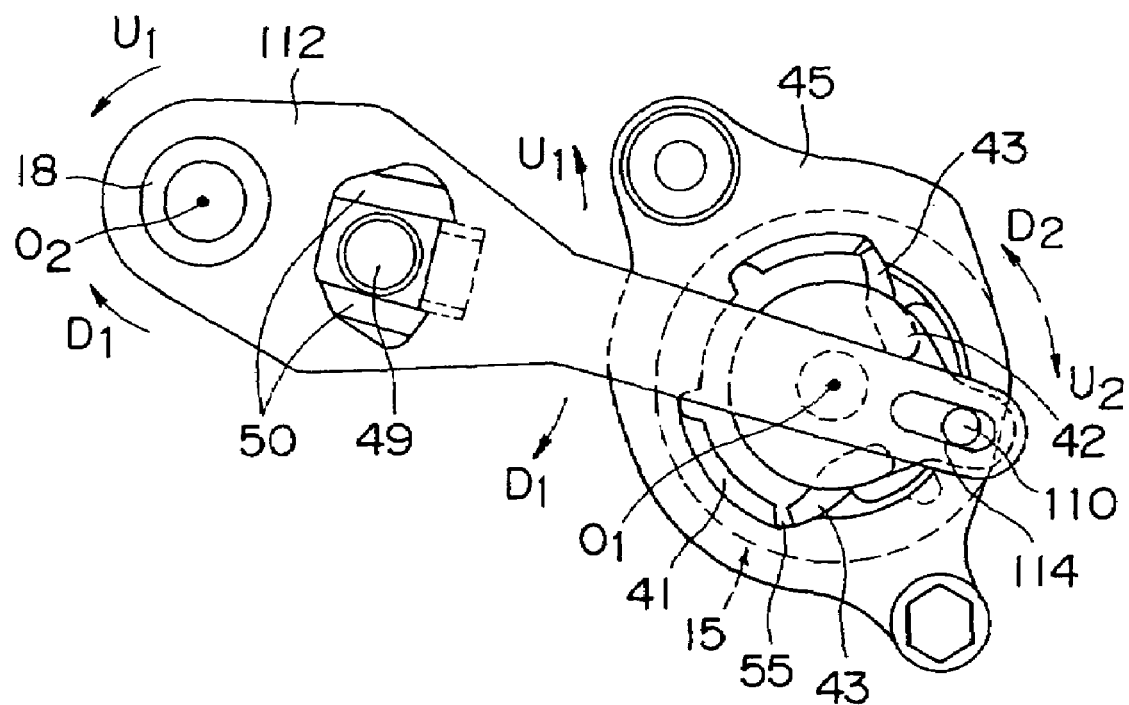
FIG. 13 shows a modified example of the change operation force transmitting mechanism in FIG. 1, and is a similar side elevational view to FIG. 3.

(3) In FIG. 13, as a mechanism of rotating the pole holder 42 by the change shaft 18, the pole holder 42 is provided in a protruding manner with a pin 110 eccentric from the axial core O1 of the change drum 15, and an arm 112 extending toward the pole holder 42 is fixed to the change shaft 18, and a long hole 114 with which the pin 110 is engaged is formed in a leading end portion of the arm 112. In accordance with this structure, the rotation of the change shaft 18 at the predetermined angle is transmitted to the pole holder 42 via the arm 112, the long hole 114 and the pin 110. In this embodiment, the same reference numerals are attached to the same parts as those of the embodiment in FIGS. 1 to 9.

Figure 14:
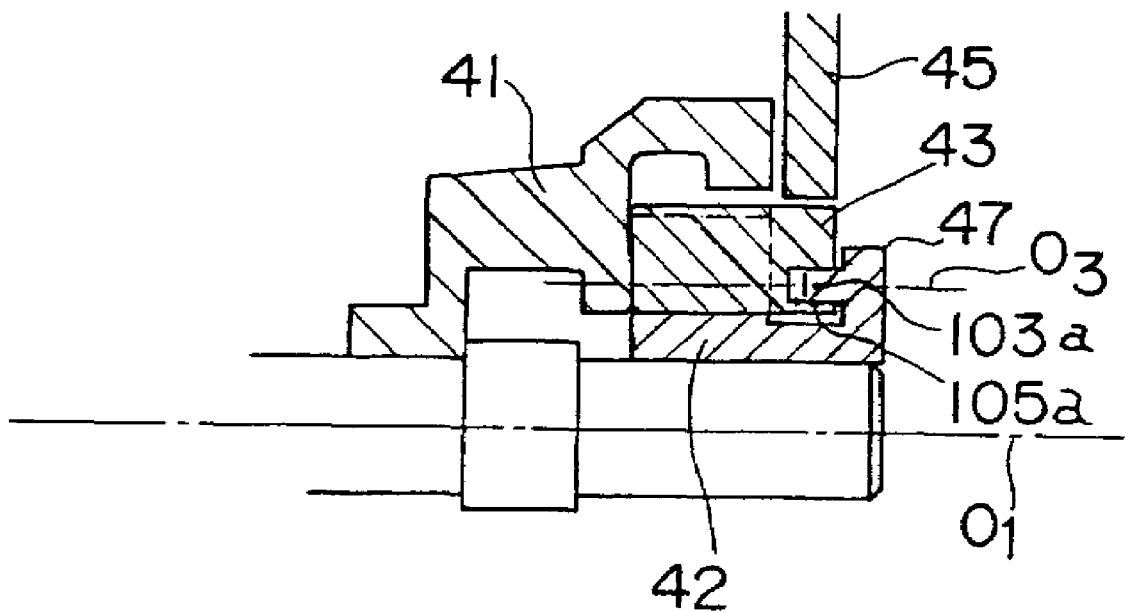
FIG. 14 shows the further other modified example of the limiting means of the pole supporting point, and is a similar cross sectional view of to FIG. 12.
Figure 15:
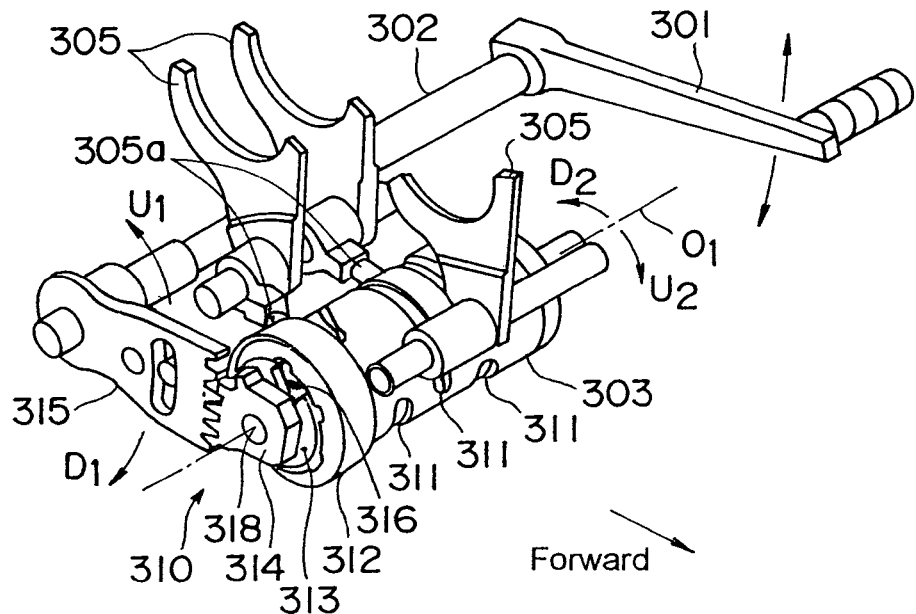
FIG. 15 is a perspective view of a change operation force transmitting mechanism of a transmission in accordance with a prior art.
Figure 16:
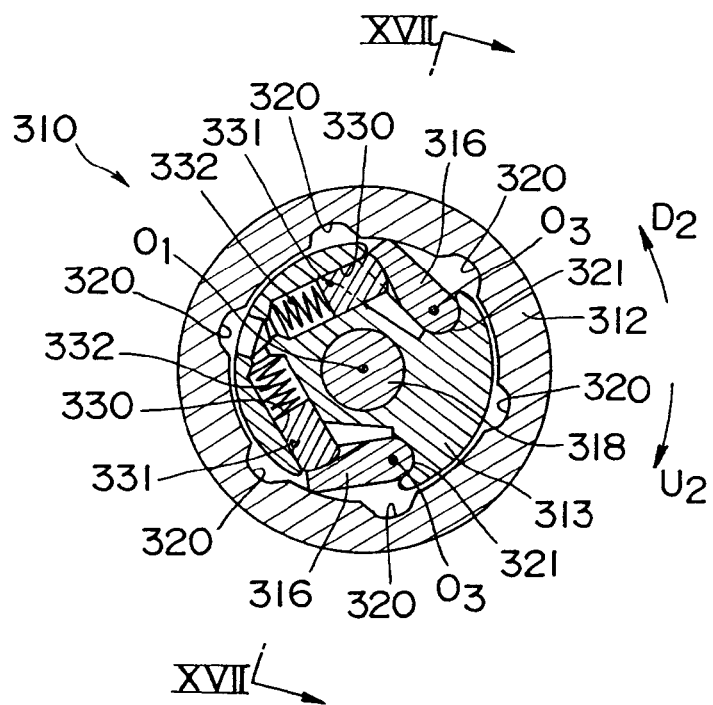
FIG. 16 is an enlarged view of a cross section obtained by cutting a pole holder in FIG. 15 by a surface perpendicular to an axial core of a change drum.

(4) FIG. 14 shows the other modified example of the limiting means of the pole supporting point O3. A support hole 105a in parallel to the axial core O1 of the change drum 15 is formed in an end surface of the pole supporting point O3 in the axial direction, and a pole supporting shaft 103a formed in the end surface of the second sector gear 47 is supported to the supporting hole 105a. In this embodiment, the same reference numerals are attached to the same parts as those of the embodiment in FIGS. 1 to 9.

Figure 17:
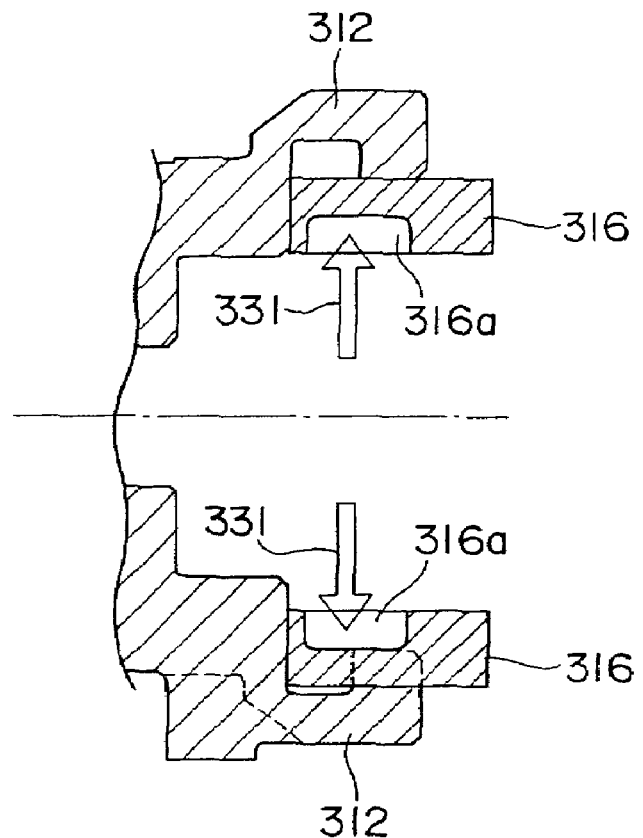
FIG. 17 is an enlarged view of a cross section along a line XVII-XVII of a driven body and a pole in FIG. 16, in which the upper pole is shown in a state in which it is disconnected form a concave portion.
Figure 18:
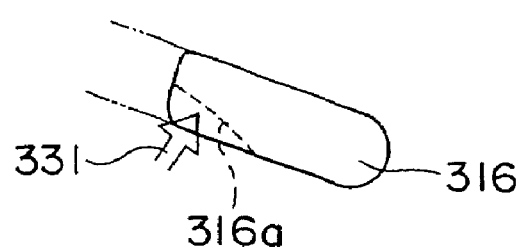
FIG. 18 is an enlarged side elevational view of the pole in FIG. 15.

(5) In all of the embodiments, the cross sectional shape of the pole is uniformly formed over the width in the axial direction, however, it is possible to form the similar groove to that in FIG. 17 at a position with which the push rod 58 is brought into contact.

(6) The description is given of several embodiments in accordance with the present invention, however, it goes without saying that different embodiments can be widely structured within the scope of the present invention, and the present invention is not limited to the embodiments mentioned above except the limitation of claims.

What is claimed is:

1. A transmission of a vehicle comprising:
a plurality of change gears supported by a plurality of gear support shafts, the plurality of gear support shafts having an axial direction;
a shift member configured to change an engaged state of the change gears by moving in the axial direction of the gear support shafts;
a change drum having a cam groove configured to engage the shift member in an outer peripheral surface thereof and move the shift member in the axial direction of the gear support shafts by rotating at a predetermined angle;
a change shaft configured to be rotationally operated at a predetermined angle by a rider; and
a change operation force transmitting mechanism configured to transmit the rotation of the change shaft to the change drum,
wherein the change operation force transmitting mechanism includes:
a driven body configured to integrally rotate with the change drum and having an inner side and a concave portion in an inner peripheral surface thereof;
a pole holder arranged in the inner side of the driven body and configured to rotationally reciprocate on the basis of the rotational operation of the change shaft;
a pole having a supporting point, being held to the pole holder, and being displaceable around the supporting point between an engaged state in which a leading end of the pole is engaged with the concave portion and a disengaged state in which the leading end is disengaged from the concave portion toward an inner side in a radial direction of the pole holder;
an energizing device configured to push the pole to the engaged state; and
a limiting device configured to limit displacement of the pole around the supporting point of the pole with respect to the pole holder,
wherein the pole has a cross sectional shape, and a base with a cross sectional shape and the cross sectional shape of the base end of the pole is formed in a partially circular shape, a portion of the pole engaged with the concave portion is formed in a semicircular shape, and the base end is rotatable around the supporting point of the pole; and
wherein the cross sectional shape of the pole in an axial direction of the pole holder is identical over an entire width of the pole holder and a back surface of the pole with which a push rod is brought into contact is formed in a concaved circular arc shape when viewed from a side of the pole.

2. The transmission of the vehicle as claimed in claim 1, wherein the limiting device is a pair of engagement portions which are formed respectively in the pole and the pole holder and are engaged with each other.

3. The transmission of the vehicle as claimed in claim 2, wherein one of the pair of engagement portions is a concave engagement portion and the other of the pair of engagement portions is a convex engagement portion.

4. The transmission of the vehicle as claimed in claim 1, wherein the limiting means is constituted by a support hole provided in one of the pole and the pole holder, and a pole support shaft provided in the other and fitted to the support hole.

* * * * *